Oct. 31, 1961     R. L. SAXTON     3,006,029
EXTRUDER MIXING SCREW
Filed Nov. 13, 1958
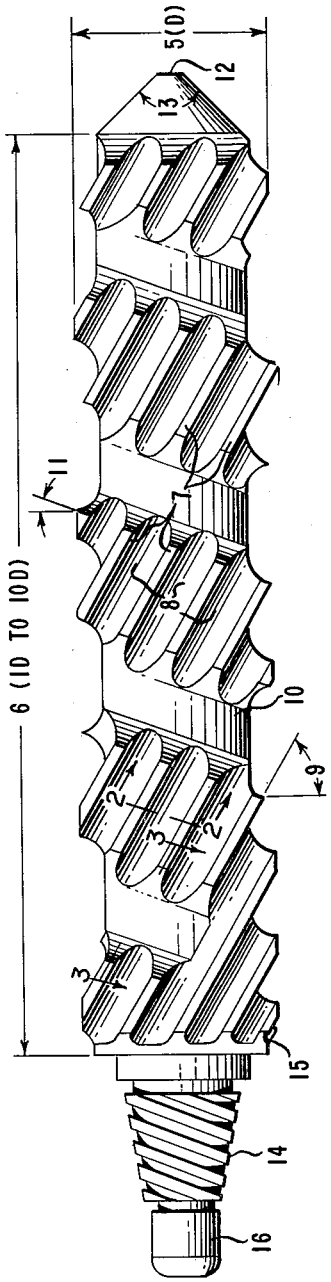
INVENTOR
RONALD LUTHER SAXTON
BY *Earl L. Tyner, Jr.*
ATTORNEY

United States Patent Office 3,006,029
Patented Oct. 31, 1961

3,006,029
EXTRUDER MIXING SCREW
Ronald Luther Saxton, Yorklyn, Del., assignor to E. I. du Pont de Nemours and Company, Wilmington, Del., a corporation of Delaware
Filed Nov. 13, 1958, Ser. No. 773,746
5 Claims. (Cl. 18—12)

This invention relates to an improved mixing screw for a plastics extrusion machine, and more particularly to a mixing device that may be used in conjunction with a standard helical extruder screw.

The blending of organic thermoplastics with such modifying materials as plasticizers, lubricants, pigments or dyes formerly required the use of dry mixers, compounding rolls, kneaders, masticators, or other diverse machines. Because these operations were costly and time-consuming, they were particularly undesirable in commercial preparation of plastics. In initial attempts to eliminate the multiple handling steps described above by increasing the efficiency of an extruder, various baffles and constrictions were provided in the extrusion zone. Although these constrictions and baffles improved the mixing ability of a given extruder, they created a substantial back-pressure in the extruder and necessitated uneconomical amounts of work to extrude a plastic around these baffles and constrictions. A fairly recent, and perhaps the most effective mixing device to date which eliminated the multiple handling steps is described in U.S. Patent No. 2,753,595 issued to F. E. Dulmage on July 10, 1956 and in U.S. Patent No. 2,607,077 issued to F. E. Dulmage on August 19, 1952. The mixing device or torpedo of the above-mentioned patents when attached to a standard helical screw improved the mixing ability of the screw by virtue of the fact that the torpedo comprised a plurality of grooves of the same hand as the screw which extended the entire length of the torpedo and which were interrupted by one or more circumferential necklike constrictions of a depth equal to that of the grooves. These grooves blend the plastic feed as the feed is advanced along the barrel. Although the use of this torpedo increases the mixing of plastic material during extrusion, certain disadvantages are inherent in its use. The circumferential interruptions prevent the scraping of that portion of the extruder barrel which lies adjacent to the interruptions, and thus allows prolonged contact of a portion of the plastic feed with the hot extruder barrel. This situation must result in degradation of heat sensitive plastics. Further, this mixing torpedo retains a substantial amount of plastic feed in the torpedo at the termination of an extrusion run, and thus causes some contamination of the next feed composition to be extruded through the same machine.

It is an object of this invention to provide an improved extrusion device which includes a mixing section or screw that may be adapted to, or be integrally formed with, an extruder screw in a plastics extruder or other means for supplying a plasticated material to the mixing section or screw in such a fashion that the mixing efficiency of the particular device is markedly increased without markedly increasing the power required to advance the plasticated material through the mixing section. Another object is to provide an extrusion apparatus which reduces the amount of material retained in a mixing section or screw when an extrusion device with a mixing screw is purged or run with no feed; for example, when a change is made from one type of plastic composition to another. Still another object of this invention is to provide an extrusion apparatus in which any unscraped portions of the extruder barrel adjacent to the mixing screw are virtually eliminated so as to minimize degradation of heat-sensitive plastics by preventing any prolonged contact of a given portion of plastic with the hot barrel which surrounds the mixing screw or section.

The above objects are accomplished by providing an improved extruding device which comprises a mixing section or screw of novel geometrical design which is rotatable within a stationary cylindrical barrel and which is provided with a means for receiving and discharging a plasticated thermoplastic material. The mixing section or screw comprises a plurality of minor flights and channels, each channel of constant cross-section throughout the length of the screw or section and each minor flight and channel helically disposed at equal angles in the range of 10°–90° either right or left hand. The minor channels have a width as measured on a line extended perpendicular to the angular disposition of the minor channels and at the outside surface of the mixing screw of from 0.1 to 0.9 times the outside diameter of the mixing screw and have a depth as measured on a radial line from the axis of the mixing screw of from 0.05 to 0.3 times the outside diameter of the mixing section or screw. The minor flights and channels are interrupted by one or more major channels which usually have a hand opposite to the hand of the minor flights and channels. These major channels are helically disposed at an angle of from 10° to 70° and have a combined width as measured on a line perpendicular to the angular disposition of the major groove and at the outside surface of said screw from 0.1 to 0.9 times the outside diameter of the mixing screw and have a depth as measured on a radial line from the axis of the mixing screw of from 0.05 to 0.3 times the outside diameter of said screw expressed in inches. When more than one major channel is used the individual width of each major channel may be expressed as $$\frac{0.1}{N} - \frac{0.9}{N}$$

times the outside diameter of the mixing screw where N is the number of major channels. The mixing section or screw as described above may be used in combination with an extruder screw for advancing plastic feed along a cylindrical barrel. In this instance the mixing screw is positioned coaxial and continuous with the extruder screw and functions as an extended portion of the extruder screw.

A more complete understanding of the mixing section or screw of this invention may be had by referring to the drawing attached hereto and made a part of this specification. FIGURE 1 is a side view of the mixing screw of this invention, and, for purpose of illustration, is shown with one threaded coupling which may be screwed into a suitable tap in a helical extruder screw. FIGURE 2 is a partial cross-section taken along the line 2—2 of FIGURE 1. FIGURE 3 is a partial cross-section taken along the line 3—3 of FIGURE 1.

In the following description the dimensions of the screw are assigned a range of values which are considered as the optimum range for this invention. Thus, a single value in each range may be selected for a particular screw design depending upon the conditions of the particular extrusion operation. The dimensions of the parts of this screw are expressed as a factor of the desired diameter D of the mixing screw. The term "upstream" as used herein refers to the direction opposite to the main mass flow of plastic through the extruder barrel, and the term "plasticated" refers to that state of a compound in which its behavior is that of a viscous or viscoelastic fluid. In FIGURE 1, the mixing screw of this invention is shown with the outside diameter 5 of D inches. The length of the mixing section 6 may be from 1 to 10 times the diameter D, or longer if required. The number of minor flights 7 and minor channels 8 may vary from 3 to 18 and may have a lead of 0.55D or greater with a helix angle 9 of from 10° to 90°. The major channel 10 may have a lead of from 0.55D to 8.6D and a helix angle 11 of from 10° to 70° right or left hand. For the purpose of illustration, the major channel 10 of FIGURE 1 is arranged with a left-hand spiral. The blunt nose 12 is joined to the ends of the minor flights and channels by a conical surface having an interior apex angle 13 of approximately 90°. For purposes of illustration, the base of this particular mixing screw is threaded for easy adaption to an existing extruder screw such as a deep flighted helical screw, a metering-type screw or a diminishing pitch helical screw. The cylindrical portion 15 of the mixing section is sized to the same diameter as the root diameter of the extruder screw. The threaded portion 14 of the base and the butt 16 are sized in such a manner that the shaft of the standard screw is not weakened by the tapping operation to the extent that the shaft is no longer strong enough to transmit the required torque. The mixing screw of this invention may be incorporated in an existing extruder by increasing the length of the barrel or by removing a portion of the existing screw so that no addition to the barrel is necessary. Generally, it is desirable to provide the minor flights and channels with the same hand as the extruder screw and the major channels with a hand opposite thereto. The mixing section or screw may be located at any position on the extruder screw at which the stock is substantially completely molten or plasticated, or may be inserted as two or more sections. The feed to the mixing section of this invention may be obtained from a reservoir of molten plastic such as an autoclave, and therefore, the mixing section of this invention need not be coupled with a standard extruder screw. If it is found advantageous to fabricate an extruder screw that incorporates the mixing section or sections of this invention, the mixing portion may be designed as an integral part of the screw by continuing the screw flight as one of the minor flights of the mixing screw. The radial clearance between the mixing screw and the barrel is not a critical feature of this invention, and standard operable tolerances, which are well known to the art, may be used in the design of this mixing screw. Generally, it has been found that a 5 mil radial clearance between the screw flight and the barrel works well with a mixing screw of up to 2.5 inches in diameter Slightly greater tolerances may be required for mixing screws of larger diameter.

FIGURE 2 shows a partial section of the mixing screw along the line 2—2 in FIGURE 1. The width 17 of the minor flights 7 may vary from 0.05D to 0.10D. The depth 18 of the minor channels 8 may vary from 0.05D to 0.3D, and the width 19 of the minor channels 8 may vary from 0.1D to 0.9D, depending on the number of minor channels. As previously described above, the measurements are expressed as a factor of the outside diameter D of the screw.

FIGURE 3 shows a partial section of the mixing screw along line 3—3 in FIGURE 1. The depth 20 of the major channel 10 is in the same range; namely, from 0.05D to 0.3D, as the depth 18 in FIGURE 2. The depth of the minor and major channels, 18 and 20, is the most critical variable in the design of the mixing screw. Usually the depth of the minor channels as measured along a radial line is equal to the depth of the major channel or channels measured in the same direction; however, the depth of the minor and major channels need not be equal as long as the depth of each set of channels is from 0.05 to 0.3 times the outside diameter of the mixing screw. The width 21 of the major channel is approximately 1 to 5 times the width of the minor channel. The major channel or channels need not be continuous, but may be crossed by a minor flight at intervals. The shape or profile of the minor and major channels is not a critical feature of this invention, but standard streamlining practices should be followed. In general, fillet radii of from 0.5 to 2.0 times the channel depth have been found satisfactory.

By providing a mixing screw as described above and claimed herein that may be adapted to a standard extruder screw or formed integrally therewith, it is possible to obtain not only exceptionally efficient mixing without a marked increase in the power input to a given extruder screw but also extremely rapid mixing. In many cases no changes to the original driving mechanism will be necessary. Because of the greater channel depth the volume holdup of the screw of this invention is higher than the holdup of the screws of the prior art, and consequently the mixing efficiency of the present screw is markedly higher than that of previous mixing screws. Both the cross-contamination between materials extruded in succession and the time of contact of a given portion of plastic with the hot extruder barrel are reduced by the helical arrangement of the major channel or channels and the minor flights and channels on the mixing screw. The width and lead of the major or interrupting channel are adjusted to the lead of the multiple minor flights and channels so that the inside surface of the barrel of the extruder is swept over by at least one of the multiple flights at each revolution of the mixing screw. Unlike the majority of the prior art devices, this feature prevents the formation of a relatively stationary mass of plastic on the inner surface of the barrel, and thus prevents overheating and subsequent thermal or autogenic degradation of the plastic feed. When the major channels and the minor flights and channels have the same hand, the selection of the angular difference between the helix angles of the minor and major channels will depend upon the width and number of the minor and major channels and generally is not less than 10°, however, the final selection should be such as to insure that every point on the inside surface of the barrel adjacent to the mixing section is scraped by a minor flight at each revolution of the mixing section. The cross-sectional configuration and the cross-sectional area of the major and minor channels are preferably constant throughout the entire length of the mixing section or screw. However, if it is desired to increase or decrease the velocity of the plastic as the plastic traverses the mixing screw, the channels may be tapered by retaining substantially the same cross-sectional configuration and decreasing or increasing, respectively, the cross-sectional area of the channels at a substantially uniform rate as the channels extend downstream over the mixing screw. Channels of constant cross-section may be discontinuous throughout the length of the screw with the transition therebetween accomplished by zones of tapered channels. The tapering should be arranged so that it does not cause unbalance of the forces which are compressing the plastic. This unbalance could cause the mixing section to run off center and result in excessive wear to both the screw and the extruder barrel.

The following examples are intended to illustrate and not to restrict the invention. The melt index of the polymer used in the examples was determined according to the tentative A.S.T.M. Specification No. D-1238.

EXAMPLE I

In this example, a mixing screw, or torpedo, of the type described and claimed in U.S. Patent No. 2,453,088 issued to F. E. Dulmage on November 2, 1948, was fabricated, and then the performance of said torpedo was compared to a torpedo of this invention which had the same length and diameter, and approximately the same holdup volume. The following data (Table 1) show the dimensions and arrangement of the flights and channels of the two mixing screws, and the volumes of plastic material retained by each mixing section when the feed to the extruder was discontinued and the screw was permitted to eject all the plastic material possible. The data on the amounts of plastic retained were obtained by extruding a high-pressure polyethylene of melt index 2.1, discontinuing the feed to the extruder and allowing the extruder to run dry, removing the main screw together with the mixing section, and collecting and weighing the material clinging to the mixing section. The weights thus obtained were then converted to volume units. The holdup volume is the volume of the channels of the screw. This was measured by noting the decrease in the volume of water displaced by the screw section after the channels had been machined in a cylindrical blank.

It may be seen that with comparable holdup volumes, the volume of plastic retained by the helically interrupted screw of this invention (2) is significantly less than that retained by the circumferentially interrupted screw of the prior art. This illustrates an advantage accruing to the complete wiping of the barrel surface which is accomplished by the helical arrangements of the flights and channels on the screw of this invention.

TABLE 1

*Comparison of the self-cleaning action of circumferentially interrupted and helically interrupted mixing screws*

| Mixing Screw Number | 1 | 2 |
|---|---|---|
| Type of Mixing Section | Circumferentially interrupted design of U.S. Patent No. 2,453,088. | Helically interrupted screw of present design. |
| Outside Diameter, in | 2.0 | 2.0. |
| Flighted Length, in | 9.0 | 9.0. |
| Number of Channels: | | |
| Minor | 12 | 12. |
| Major | 2 | 1. |
| Channel Depth, in.: | | |
| Minor | 0.125 | 0.125. |
| Major | 0.125 | 0.125. |
| Channel Helix Angle, deg.: | | |
| Minor | 60 (right hand) | 60 (right hand). |
| Major | 0 (circumferential). | 19.7 (left hand). |
| Holdup Volume, in.³ | 4.9 | 4.6. |
| Volume of Plastic Retained after Pumping Out, in.³ | 1.31 | 0.73. |
| Fraction of Total Holdup Volume Remaining Filled after Pumping Out. | 0.268 | 0.159. |

EXAMPLE II

In this example a comparison of the power required by a mixing screw of the present invention and by the mixing screw of prior art designated (1) in Table 1 of Example I was made. The power consumed was measured in terms of the rise in temperature produced in a particular plastic melt when the plastic melt was passed through the mixing section. For a particular plastic the initial melt temperature, the screw speed, and the mass flow rate were held constant. Experiments were performed using a polyethylene prepared by coordination polymerization having a density at 23° C. of 0.952 g./cc. and a melt index of 0.5, and a Fawcett-type polyethylene having a density at 23° C. of 0.923 g./cc. and a melt index of 2.1. The pertinent data, including the increase in drive horsepower consumption, calculated from the measured increases in melt temperature, are given in Table 2.

The results show that the mixing screws of greater channel depth require less power than do the screws of prior art which have relatively shallow channel depths, and lower holdup volumes. Further, screws of relatively greater channel depth and greater holdup volume exhibit superior mixing efficiency, as evidenced by the results given in the following example.

TABLE 2

*Comparison of the power requirements of mixing screws of varying holdup volume*

| Mixing Screw Number | 1 | 3 | 4 |
|---|---|---|---|
| Outside Diameter, in | See Table 1 | 2 | 2 |
| Flighted Length, in | do | 9 | 9 |
| Number of Channels: | | | |
| Minor | do | 12 | 6 |
| Major | do | 1 | 1 |
| Channel Depth, in.: | | | |
| Minor | do | 0.250 | 0.250 |
| Major | do | 0.250 | 0.250 |
| Channel Helix Angle, deg.: | | | |
| Minor | do | 60 | 60 |
| Major | do | 19.7 | 19.7 |
| Holdup Volume, in.³ | do | 10.0 | 11.2 |
| Temperature Rise Produced by Mixing Section, deg. C.: | | | |
| Melt Index=0.5 | 54 | 46 | 48 |
| Melt Index=2.1 | 29 | 27 | 21 |
| Added Horsepower due to Mixing Section: | | | |
| Melt Index=0.5 | 1.14 | 0.98 | 1.03 |
| Melt Index=2.1 | 0.31 | 0.29 | 0.22 |

EXAMPLE III

In this example a comparison of the mixing efficiency of 1 and 3 mixing screws of Example II above was made. A dry blend of a minor component of polyethylene resin cubes with a melt index of 0.25 which contained a tracer material and a major component of polyethylene resin cubes with a melt index of 2.10 was extruded at 50 r.p.m. and 224–232 grams per minute using alternately mixing screws 1 and 3 of Example II. This dry blend represents a difficult but realistic mixing task. A photograph was made of the magnified cross-sections of the strand which was extruded using each of the two screws, and measurements were made of the size of particles of unmixed minor component in the two strands. The strand of screw 3 had no regions which contained the tracer material greater than 0.25 mil in diameter, while regions as large as 3.0 mils were found in the strand of screw 1. The mixing efficiency of screw 4 of Table 2 was very similar to that of screw 3. A markedly higher mixing efficiency was achieved by the screw of this invention.

The mixing screw of this invention should find wide use in systems which require both extrusion and mixing of thermoplastics and systems where it is desired to add a material which reacts with a plastic, or with non-reactive materials such as pigments, during extrusion. The number of minor flights and channels will probably vary according to the types of extrusion jobs encountered. Generally, from 3 to 18 minor flights and channels are preferred. The interrupting channel, or major channel, as it is identified herein, may be of the same or of opposite hand as the standard screw. One or more major channels may be used to interrupt the minor flights and channels as long as the relative dimensions as set forth in the specification and claims are closely followed. The major channel or channels may be discontinuous in that they may be cut through at intervals by a minor flight. As explained above, the mixing screw may be added to an existing screw by increasing the length of the barrel of the extruder or may be added to an existing screw by shortening the length of said screw and not increasing the length of the barrel or be formed as an integral part of a standard helical screw. In addition, the mixing screw of this invention may be rotated with a standard drive and may receive its supply of molten plastic from a suitable reservoir or like sources.

I claim:

1. An improved extruding device which comprises a mixing screw of novel geometrical design; said mixing screw being rotatable with a stationary cylindrical barrel receiving and discharging a plasticated thermoplastic material; said screw comprising a plurality of minor flights and minor channels being helically disposed at a heilx angle of from 10°–90°; said minor channels having a width as measured at the outside surface of said screw of 0.1–0.9 times the outside diameter of said screw; and having a depth as measured on a radial line from the axis of said screw of 0.05–0.30 times the outside diameter of said screw; said minor flights and minor channels being interrupted by major channels which are helically disposed at a helix angle of from 10°–70° and each having a width as measured at the outside surface of said screw of from $$\frac{0.1}{N} \text{ to } \frac{0.9}{N}$$

times the diameter of said screw, where N is the number of said major channels, and having a depth as measured on a radial line from the axis of said screw of 0.05–0.3 times the outside diameter of said screw wherein the number obtained by multiplying the width of the interrupting channel in inches and the cosine of the helix angle of the interrupting channel is less than the number obtained by multiplying the circumference of the mixing screw in inches and the tangent of the helix angle of the interrupting channel.

2. An improved extruding device which comprises a mixing screw of novel geometrical design; said mixing screw being rotatable within a stationary cylindrical barrel receiving and discharging a plasticated thermoplastic material; said screw comprising a plurality of minor flights and minor channels, having a constant cross-section throughout the length of said screw and being helically disposed at a helix angle of from 10°–90°; said minor channels having a width as measured at the outside surface of said screw of 0.1–0.9 times the outside diameter of said screw and having a depth as measured on a radial line from the axis of said screw of 0.05–0.30 times the outside diameter of said screw; said minor flights and minor channels being interrupted by major channels; said major channels having a hand opposite to the hand of the minor flights and channels, being helically disposed at a helix angle of from 10°–70°, having a width as measured at the outside surface of said screw of from 0.1–0.9 times the diameter of said screw, and having a depth as measured on a radial line from the axis of said screw of 0.05–0.3 times the outside diameter of said screw wherein the number obtained by multiplying the width of the interrupting channel in inches and the cosine of the helix angle of the interrupting channel is less than the number obtained by multiplying the circumference of the mixing screw in inches and the tangent of the helix angle of the interrupting channel.

3. In an extruder, the improvement which comprises a mixing screw of improved geometrical design in combination with an extruder screw for advancing plastic feed along a cylindrical barrel; said mixing screw being coaxial and continuous with said extruder screw and rotatable within said barrel; said mixing screw comprising a plurality of minor flights and minor channels, helically disposed at a helix angle of 10°–90°; said minor channels having a width as measured at the outside surface of said mixing screw of 0.1–0.9 times the outside diameter of said mixing screw, and having a depth as measured on a radial line from the axis of said screw of 0.05–0.3 times the outside diameter of said mixing screw; said minor flights and minor channels being interrupted by major channels; said major channels being helically disposed at a helix angle of 10°–70°, and having a width as measured at the outside surface of said mixing screw of $$\frac{0.1}{N} - \frac{0.9}{N}$$

times the outside diameter of said screw, where N is the number of major channels, and having a depth as measured on a radial line from the axis of said screw of 0.05–0.3 times the outside diameter of said mixing screw wherein the number obtained by multiplying the width of the interrupting channel in inches and the cosine of the helix angle of the interrupting channel is less than the number obtained by multiplying the circumference of the mixing screw in inches and the tangent of the helix angle of the interrupting channel.

4. In an extruder, the improvement which comprises a mixing screw of improved geometrical design in combination with an extruder screw for advancing plastic feed along a cylindrical barrel; said mixing screw being coaxial and continuous with said standard screw, substantially an extended portion of said standard screw, and rotatable within said barrel; said mixing screw comprising a plurality of minor flights and minor channels, each of constant cross-section throughout the length of said mixing screw, helically disposed at a helix angle of 10°–90°; said minor channels having a width as measured at the outside surface of said mixing screw of 0.1–0.9 times the outside diameter of said mixing screw, and having a depth as measured on a radial line from the axis of said mixing screw of 0.05–0.3 times the diameter of said mixing screw; said minor flights and minor channels being interrupted by a major channel having a hand opposite to the hand of the minor flights and channels; said major channel being helically disposed at a helix angle of 10°–70°, and having a width as measured at the outside surface of said screw of 0.1–0.9 times the outside diameter of said mixing screw, and having a depth as measured on a radial line from the axis of said mixing screw of 0.05–0.3 times the outside diameter of said mixing screw wherein the number obtained by multiplying the width of the interrupting channel in inches and the cosine of the helix angle of the interrupting channel is less than the number obtained by multiplying the circumference of the mixing screw in inches and the tangent of the helix angle of the interrupting channel.

5. The mixing screw of claim 4, wherein the hand of the minor flights and channels is of the same hand as the extruder screw.

References Cited in the file of this patent
UNITED STATES PATENTS 2,753,595    Dulmage    July 10, 1956
2,857,144    Gurley et al.    Oct. 21, 1958

UNITED STATES PATENT OFFICE
CERTIFICATE OF CORRECTION

Patent No. 3,006,029                          October 31, 1961

Ronald Luther Saxton

It is hereby certified that error appears in the above numbered patent requiring correction and that the said Letters Patent should read as corrected below.

Column 6, line 70, for "with" read -- within --; line 73, for "heilx" read -- helix --.

Signed and sealed this 3rd day of April 1962.

(SEAL)
Attest:

ERNEST W. SWIDER                                      DAVID L. LADD
Attesting Officer                                           Commissioner of Patents